W. H. COE.

ROLL FOR HOLDING AND APPLYING DECORATIVE FILMS.

No. 11,510. Reissued Oct. 22, 1895.

WITNESSES:

Saunders Schofield

Horace S. Swan.

INVENTOR:

Walter H. Coe.

UNITED STATES PATENT OFFICE.

WALTER H. COE, OF PROVIDENCE, RHODE ISLAND.

ROLL FOR HOLDING AND APPLYING DECORATIVE FILMS.

SPECIFICATION forming part of Reissued Letters Patent No. 11,510, dated October 22, 1895.

Original No. 508,869, dated November 14, 1893. Application for reissue filed August 22, 1895. Serial No. 560,177.

*To all whom it may concern:*

Be it known that I, WALTER H. COE, a citizen of the United States, residing at Providence, in the State of Rhode Island, have invented a new and useful Improvement in Rolls for Holding and Applying Decorative Films, of which the following is a specification.

The object of my invention is to provide a wound roll of metallic or other decorative films which will facilitate the use of said films and obviate the usual waste in their application.

The invention consists in the combination of a spirally-wound decorative film with a correspondingly-wound strip of paper or other suitable material, said strip having a prepared adhesive surface upon one side thereof and a prepared non-adhesive surface upon the other side, as hereinafter fully set forth.

Figure 1:
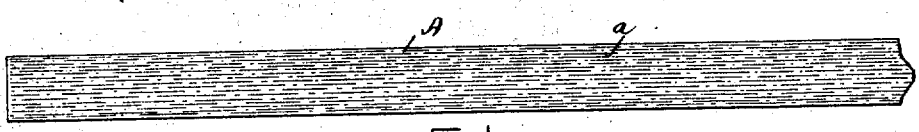
Figure 2:
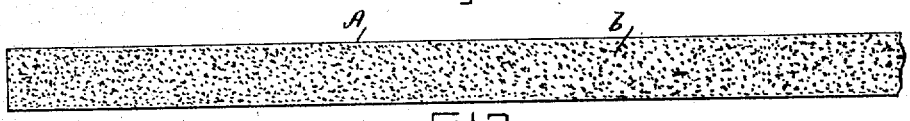
Figure 3:
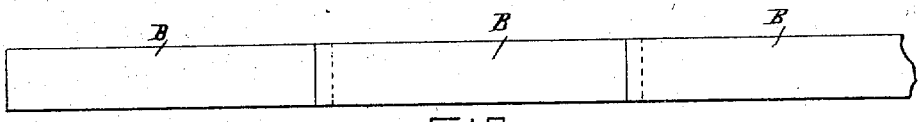
Figure 4:
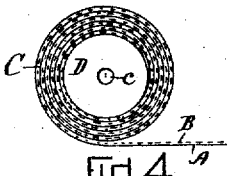
Figure 5:
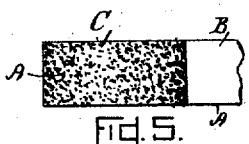

In the accompanying drawings, Figure 1 represents an outspread strip of paper or other suitable material provided with a prepared slightly-adhesive surface for contact with one side of the decorative film. Fig. 2 represents the opposite side of the same strip provided with a prepared non-adhesive surface for contact with the opposite side of the decorative film. Fig. 3 represents a spliced strip of the decorative film to be wound in the roll. Fig. 4 represents a side view of the completed roll with a portion unwound. Fig. 5 represents the edge view of the same.

In the drawings, A represents a thin paper or other suitable strip of indefinite length which upon the side *a* is provided with a thin coating of wax or other suitable material which will have a slight adhesive quality for the metallic decorative film B, and the opposite side *b* of the strip is provided with a prepared surface which is non-adhesive to the metallic film when wound into the desired roll; and I prefer to apply a suitable powder to the surface of the side *b*, like crocus or finely-powdered chalk, so that when the spliced metallic film B is placed in contact with the adhesive side *a* of the strip and formed into a roll C, as shown in Fig. 4, the said film will unroll freely from the side *b* of the strip and adhere to the side *a*, and may be deposited thence upon any suitable surface by forcible contact therewith. I prefer to hold the wound roll C upon a spool D, having a central perforation *c*, whereby the roll may be held in a suitable machine for unwinding the strip and depositing the film upon the surface to be decorated, and by my improvement the film will be unwound with the strip and be deposited in position without liability of tearing or displacement, which is a great improvement in decorative art.

In forming my improved roll for holding and applying the film, I prefer to wind the film B at the inner side of the strip A, as shown in Fig. 4; but the said film may be wound exteriorily of the strip, if desired, and in this case the film B may be transferred directly from the roll to the surface to be decorated by moving the roll over the said surface and removing the unwound strip from the deposited film.

I prefer to apply the adhesive and non-adhesive material to the opposite side of the strip while the roll is being formed and the film is being inserted.

I claim as my invention—

A roll for holding and applying decorative films, consisting of a spirally wound film, and a corresponding strip wound therewith, the said strip having a prepared adhesive surface on one side thereof, and a prepared non-adhesive surface upon the opposite side, whereby the roll may be unwound in use without liability of tearing or displacing the film.

WALTER H. COE.

Witnesses:

SOCRATES SCHOLFIELD,

HARRY J. GARCEAU.